United States Patent
Kim et al.

(10) Patent No.: US 10,404,116 B2
(45) Date of Patent: Sep. 3, 2019

(54) BLDC MOTOR

(71) Applicant: SAMSUNG ELECTRONICS CO., LTD., Suwon-si, Gyeonggi-do (KR)

(72) Inventors: Hong-seok Kim, Yongin-si (KR);
Byoung-soo Ko, Seoul (KR);
Young-kwan Kim, Anyang-si (KR);
Tae-ho Yoon, Suwon-si (KR);
Hyung-chul Lee, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 301 days.

(21) Appl. No.: 15/288,198

(22) Filed: Oct. 7, 2016

(65) Prior Publication Data

US 2017/0104375 A1    Apr. 13, 2017

(30) Foreign Application Priority Data

Oct. 8, 2015  (KR) .................. 10-2015-0141535

(51) Int. Cl.
*H02K 1/27*  (2006.01)

(52) U.S. Cl.
CPC ......... *H02K 1/2773* (2013.01); *H02K 1/2766* (2013.01)

(58) Field of Classification Search
CPC .................... H02K 1/2773; H02K 1/2766
USPC .................................................. 310/156.53
See application file for complete search history.

(56) References Cited

U.S. PATENT DOCUMENTS

| | | | |
|---|---|---|---|
| 2009/0322175 A1 | 12/2009 | Kori et al. | |
| 2011/0156521 A1 | 6/2011 | Nagashima et al. | |
| 2014/0191609 A1 | 7/2014 | Woo et al. | |
| 2014/0252903 A1* | 9/2014 | Rahman | H02K 1/02 310/156.53 |
| 2015/0137629 A1 | 5/2015 | Chowdhury et al. | |

(Continued)

FOREIGN PATENT DOCUMENTS

| | | |
|---|---|---|
| EP | 2 139 093 | 12/2009 |
| JP | 2004-104962 | 4/2004 |

(Continued)

OTHER PUBLICATIONS

Extended European Search Report dated Feb. 28, 2017 from European Patent Application No. 16192936.9, 7 pages.

(Continued)

*Primary Examiner* — Forrest M Phillips
(74) *Attorney, Agent, or Firm* — Staas & Halsey LLP

(57) ABSTRACT

The BLDC motor includes a stator, and a rotor disposed inside of the stator and including a plurality of permanent magnet parts, each of the permanent magnet parts including first and second permanent magnets which are disposed to have an interval therebetween. The rotor includes a slot part including a first portion into which the first permanent magnet is inserted, a second portion into which the second permanent magnet is inserted, and a third portion connecting the first and second portions to each other. The first and second portions have one end portions which are spaced apart from each other by a first distance and other end portions which are spaced apart from each other by a second distance which is shorter than the first distance, and the third portion connects the other end portions of the first and second portions to each other.

17 Claims, 7 Drawing Sheets

(56) References Cited

U.S. PATENT DOCUMENTS

| | | | | |
|---|---|---|---|---|
| 2015/0137648 A1* | 5/2015 | Kato | ................... | H02K 1/276 |
| | | | | 310/156.53 |
| 2015/0145371 A1* | 5/2015 | Kim | ................... | H02K 1/2766 |
| | | | | 310/156.53 |
| 2015/0171682 A1* | 6/2015 | Fujisawa | ............. | H02K 1/2766 |
| | | | | 310/156.53 |
| 2015/0171683 A1* | 6/2015 | Kim | ................... | H02K 1/2773 |
| | | | | 310/156.53 |
| 2015/0194849 A1* | 7/2015 | Kayano | ............... | H02K 1/2766 |
| | | | | 310/156.53 |

FOREIGN PATENT DOCUMENTS

| | | |
|---|---|---|
| JP | 2010-11640 | 1/2010 |
| KR | 10-1200260 | 11/2012 |
| KR | 10-1260689 | 4/2013 |
| KR | 10-2014-0091626 | 7/2014 |

OTHER PUBLICATIONS

European Examination Report issued in corresponding European Patent Application No. 16192936.9 dated Jun. 18, 2019.

\* cited by examiner

BLDC MOTOR

CROSS-REFERENCE TO RELATED APPLICATIONS

This application claims priority Korean Patent Application No. 10-2015-0141535, filed on Oct. 8, 2015, in the Korean Intellectual Property Office, the disclosure of which is incorporated herein by reference in its entirety.

BACKGROUND

1. Field

Apparatuses and methods consistent with the present disclosure relate to a brushless DC (BLDC) motor, and more particularly, to a BLDC motor in which a rotor having a permanent magnet part is disposed inside of a stator.

2. Description of the Related Art

As is well known, a motor may be classified into a direct current (DC) motor and an alternating current (AC) motor depending on the power used. Since the DC motor includes a stator and a brush, it has a disadvantage that reliability is reduced and a lifespan is shortened due to a mechanical contact between the stator and the brush.

Recently, a brushless DC (BLDC) motor with an inside-disposed permanent magnet in which the brush is removed is widely used to address the problem of the mechanical contact.

Recently, in accordance with the demand for a high efficiency motor, a BLDC motor with an inside-disposed permanent magnet having a V shape has been developed and used to prevent heating and demagnetization due to an eddy current of a magnet.

Such a BLDC motor with the inside-disposed permanent magnet having the V shape has a configuration in which the one ends of the permanent magnets having the same polarity are disposed to face each other about a connection part inside of a rotor and the other ends opposite to the one ends are disposed in a cracked shape so that a plurality of permanent magnets inside of the rotor form the V shape.

However, the BLDC motor with the inside-disposed permanent magnet having the V shape according to the related art as described above has a problem in that efficiency of the motor is decreased as leakage magnetic flux occurs through the inside of the rotor about portions at which the one ends of the permanent magnets disposed in the V shape are disposed to be too close to each other.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a BLDC motor improving effective magnetic flux by forming a barrier capable of blocking leakage magnetic flux inside of a rotor in which permanent magnets which are radially disposed about a rotation shaft in the BLCD motor with the inside-disposed permanent magnet may cause the leakage magnetic flux about the one ends which are disposed to be adjacent to each other, and improving output density of the motor by reducing a total harmonic distortion (THD) of counter electromotive force and a torque ripple of the motor.

The present disclosure also provides a BLDC motor improving output density of the motor by reducing a total harmonic distortion (THD) of counter electromotive force and a torque ripple of the motor by allowing a shape of an end portion of a permanent magnet part to have an arc shape having the same center as an outer circumferential surface of a rotor and an inner circumferential surface of a stator to thereby increase effective magnetic flux and to prevent leakage magnetic flux.

According to an aspect of the present disclosure, a brushless direct current (BLDC) motor includes a stator, and a rotor disposed inside of the stator and including a plurality of permanent magnet parts, each of the permanent magnet parts including first and second permanent magnets which are disposed to have an interval therebetween, wherein the rotor includes a slot part including a first portion into which the first permanent magnet is inserted, a second portion into which the second permanent magnet is inserted, and a third portion connecting the first and second portions to each other, and the first and second portions have one end portions which are spaced apart from each other by a first distance and other end portions which are spaced apart from each other by a second distance which is shorter than the first distance, and the third portion connects the other end portions of the first and second portions to each other.

The first and second portions may have the respective one end portions disposed on an outer circumference part of the rotor, and the respective other end portions disposed on an inner circumference part of the rotor.

The third portion may include a first surface connecting points corresponding to each other of the respective other end portions of the first and second portions; and a second surface connecting other points corresponding to each other of the respective other end portions of the first and second portions, and the first and second surfaces may have different lengths.

The first surface and the second surface may be formed in a plane or a curved surface.

The first and second portions may have thicknesses which are increased from the other end portion to the one end portion.

The first and second permanent magnets may have thicknesses which are increased from the other end portion to the one end portion.

The one end portions of the first and second permanent magnets may have a shape having the same curvature as an inner circumferential surface of the stator.

The one end portions of the first and second permanent magnets may have an arc shape which is concentric with an inner circumferential surface of the stator.

The one end portions of the first and second permanent magnets may be disposed to be spaced apart from an outer circumferential surface of the rotor by a predetermined interval.

The rotor may include a plurality of barrier holes which are each formed between the first permanent magnet and the second permanent magnet.

The barrier holes may be disposed to be spaced apart from an outer circumferential surface of the rotor by a predetermined interval.

The barrier holes may have a V shape.

The rotor may include a plurality of notches formed on an outer circumferential surface thereof.

The notches may be disposed between any one of the plurality of permanent magnet parts and another permanent magnet part which is adjacent to any one permanent magnet part.

The notches may have a V or U shape.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

The present disclosure will become apparent by describing exemplary embodiments of the present disclosure in detail with reference to the accompanying drawings. For reference, when it is determined that the detailed description of the known function or configuration related to the present disclosure may obscure the gist of the present disclosure in describing the present disclosure, the detailed description thereof will be omitted.

A rotor of a BLDC motor according to an exemplary embodiment of the present disclosure includes a plurality of permanent magnet parts. However, hereinafter, a case in which 6 permanent magnet parts are sequentially disposed along a cylindrical surface inside of the rotor while having polarity opposite to polarity of an adjacent permanent magnet part will be described by way of example.

Figure 1:
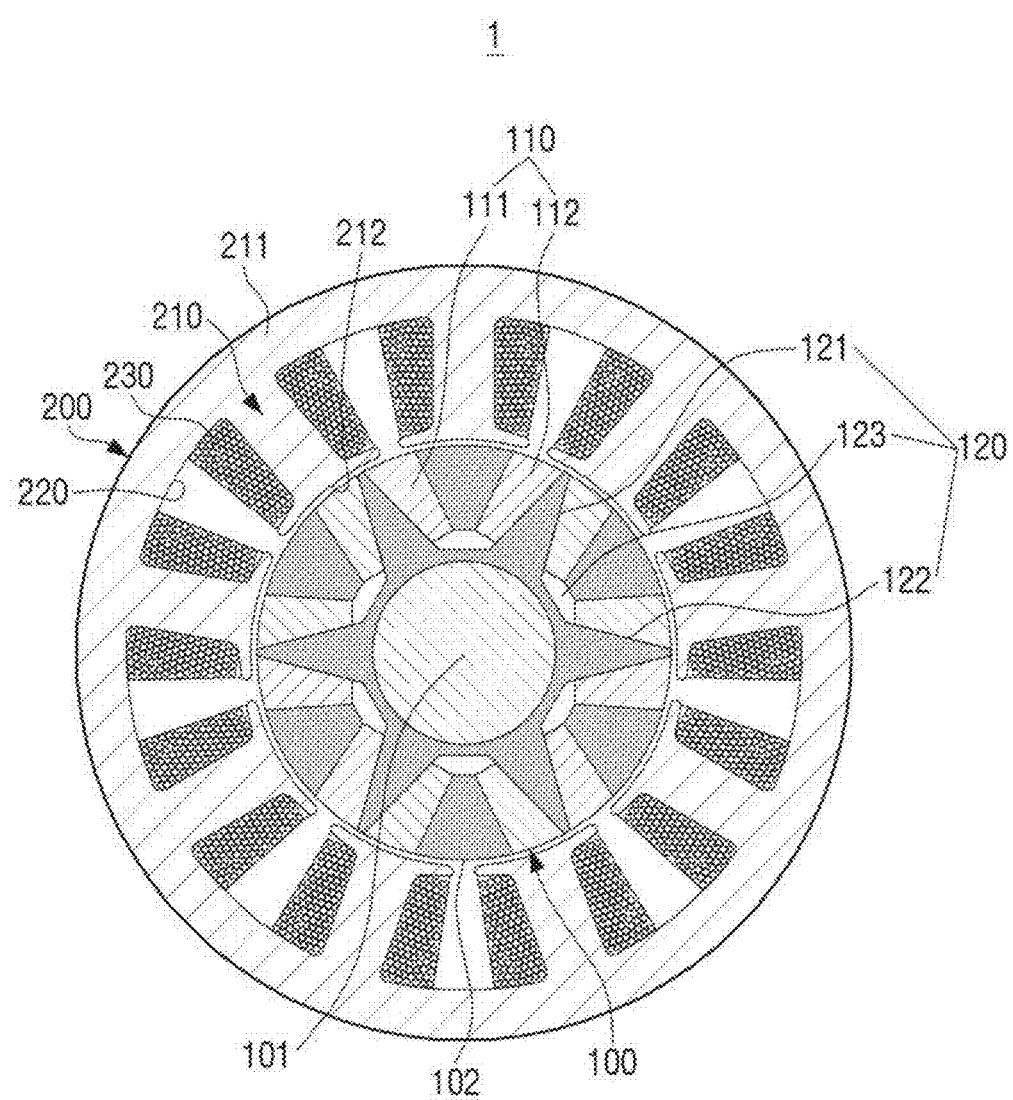
FIG. 1 is a cross-sectional view of a BLDC motor taken along a vertical direction of a rotation shaft, according to an exemplary embodiment of the present disclosure.

FIG. 1 is a cross-sectional view of a BLDC motor 1 taken along a vertical direction of a rotation shaft, according to an exemplary embodiment of the present disclosure.

The BLDC motor 1 includes a rotor 100 rotating about a rotation shaft 101, and a stator 200.

The stator 200, which is a magnetic body such as iron, is formed in a cylindrical shape, and has a circular hole formed therein, wherein the rotor 100 is rotatably disposed in the circular hole. The stator 200 includes a plurality of teeth 210 which are formed radially toward the center of the stator, and slots 220 are formed between the plurality of teeth 210.

In addition, the plurality of teeth 210 are connected to each other by a yoke part 211, and a coil 230 is wound around the plurality of teeth 210. Therefore, when a current is applied to the coil 230, the plurality of teeth 210 are magnetized, thereby applying attraction force or repulsion force to the permanent magnet parts 110 inside of the rotor 100.

In the case in which the current is sequentially applied to the coil 230 which is wound around the plurality of teeth 210 having a constant interval as described above, a rotational magnetic field occurs when polarity of each of the teeth 210 is sequentially changed, and a magnetic field by the permanent magnet part 110 is formed in the rotor 100 in which the permanent magnet part 110 opposite to each of the teeth 210 is buried.

Since the formation of the rotational magnetic field by the stator 200 as described above is the same as or similar to that used for the BLCD motor according to the related art, a detailed description thereof will be omitted.

A structure of the rotor 100 will be described below in detail with reference to FIGS. 2 and 3.

Figure 2:
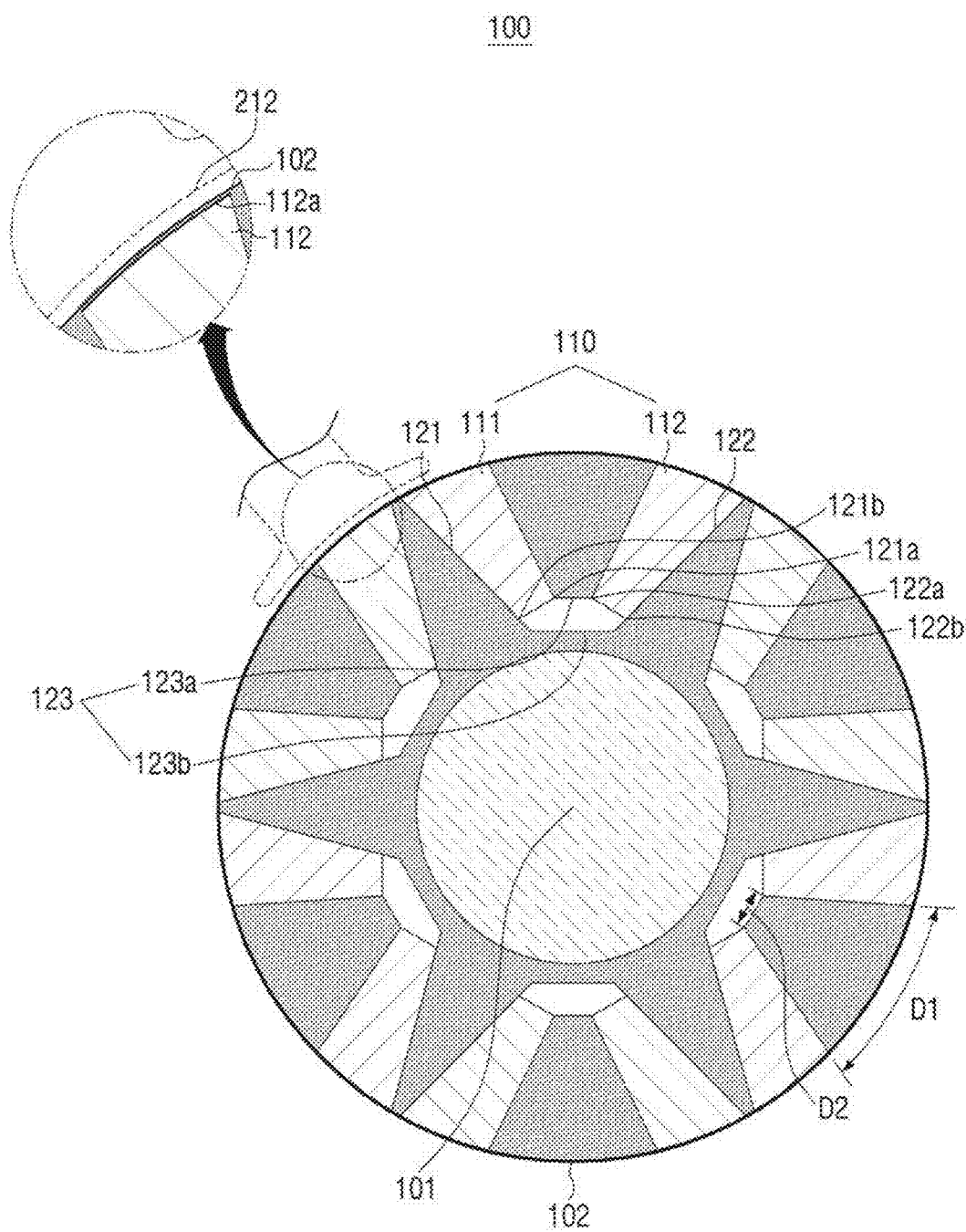
FIG. 2 is an enlarged cross-sectional view of a rotor illustrated in FIG. 1.
Figure 3:
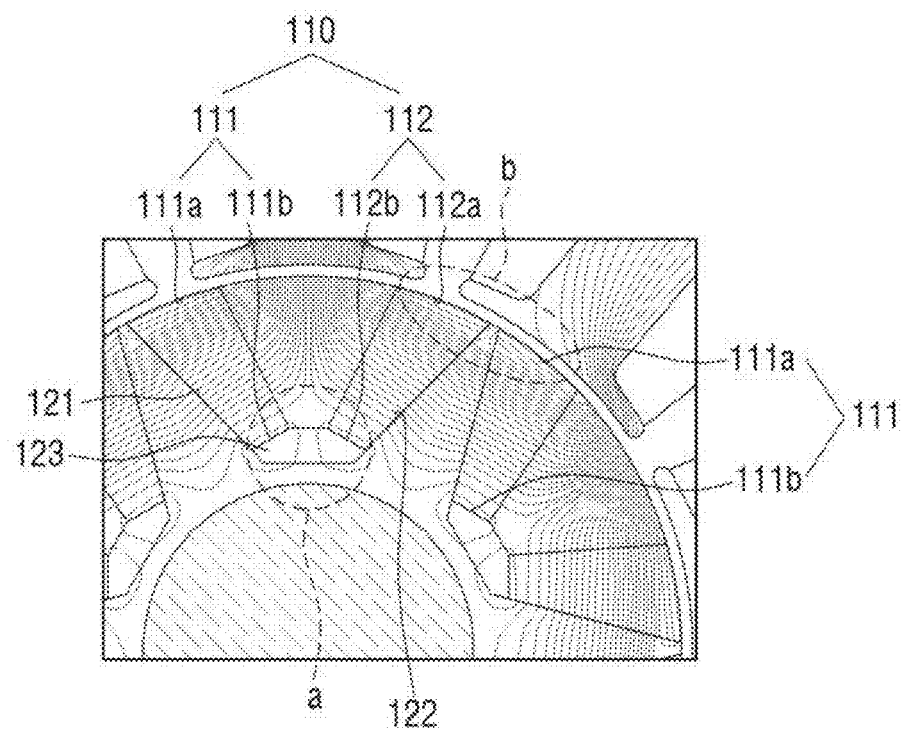
FIG. 3 is an enlarged view indicating lines of magnetic force formed at the rotor and a stator illustrated in FIG. 1.

FIG. 2 is an enlarged cross-sectional view of the rotor 100 illustrated in FIG. 1 and FIG. 3 is an enlarged view indicating lines of magnetic force formed at the rotor and a stator illustrated in FIG. 1.

The rotor 100, which is formed of metal, is formed in a cylindrical shape in which an outer circumferential surface 102 thereof corresponds to an inner circumferential surface of the stator 200, and the rotor 100 is concentric with an inner diameter of the stator 200 so as to be rotatable inside of the stator 200.

In addition, the rotation shaft 101 is coupled to the center of the rotor 100 to penetrate therethrough. Thereby, the rotor 100 is rotated together with the rotation shaft 101.

The plurality of permanent magnet parts 110 which are inserted along a shaft direction of the rotor 100 may be included inside of the rotor 100.

The plurality of permanent magnet parts 110 are disposed along the cylindrical surface of the rotor 100, and the permanent magnet parts which are adjacent to each other are disposed to have different polarities.

Figure 7A:
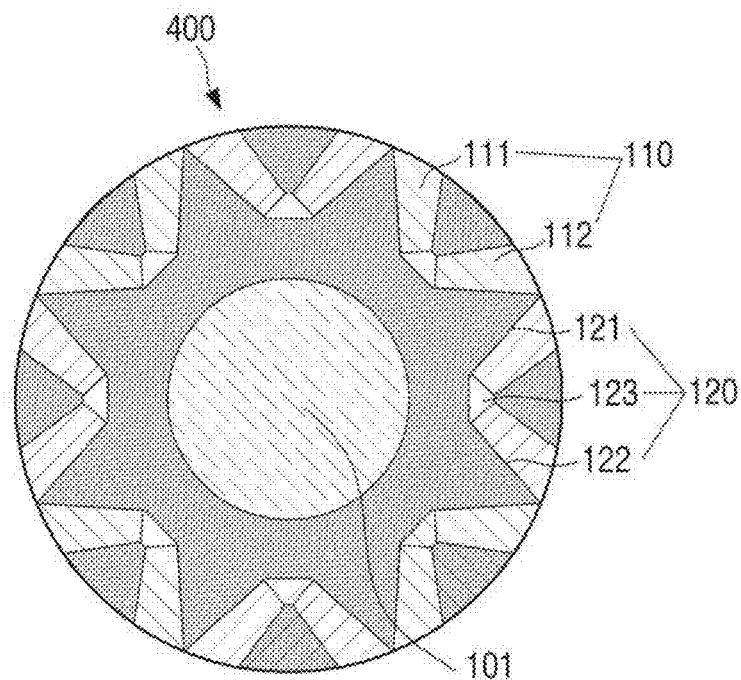
FIGS. 7A and 7B are cross-sectional views of a rotor in which 8 and 10 permanent magnet parts are included, according to another exemplary embodiment of the present disclosure.
Figure 7B:
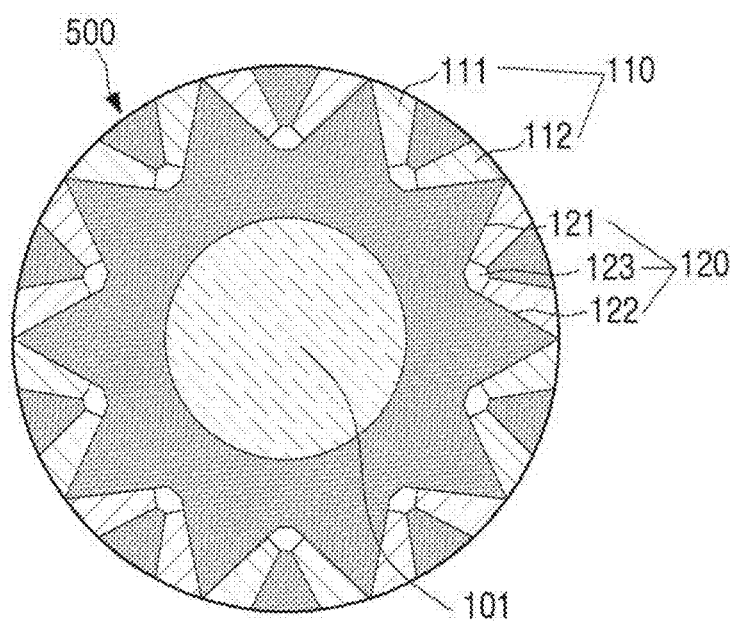

According to an exemplary embodiment of the present disclosure, 6 permanent magnet parts 110 may be included as illustrated in FIG. 2. However, as illustrated in FIGS. 7A and 7B, 8 permanent magnet parts 110 (FIG. 7A), 10 permanent magnet parts 110 (FIG. 7B), or more may also be included.

The respective permanent magnet parts 110 include a first permanent magnet 111 and a second permanent magnet 112 which are disposed while having an interval therebetween, and the first permanent magnet 111 and the second permanent magnet 112 have the same polarity.

The rotor 100 includes a slot part 120 into which the permanent magnet part 110 may be inserted.

The slot part 120 includes a first portion 121 into which the first permanent magnet 111 is inserted, and a second portion 122 into which the second permanent magnet 112 is inserted.

In addition, one end portions of the first portion 121 and the second portion 122 are spaced apart from each other by a first distance D1, and the other end portions thereof are spaced apart from each other by a second distance D2.

Therefore, one end portion 111*a* of the first permanent magnet 111 and one end portion 112*a* of the second permanent magnet 112 which are inserted into the first and second portions 121 and 122, respectively, are spaced apart from each other by the first distance D1, and the other end portion 111*b* of the first permanent magnet 111 and the other end portion 112*b* of the second permanent magnet 112 are spaced apart from each other by the second distance D2. In addition, the first distance D1 may be longer than the second distance D2.

The respective one end portions of the first and second portions 121 and 122 may be disposed on an outer circumference part of the rotor 100, and the other end portions of the first and second portions 121 and 122 may be disposed on an inner circumference part of the rotor 100.

Therefore, based on the center of the rotor 100, the respective one end portions 111a and 112a of the first and second permanent magnets 111 and 112 may be disposed on the outer circumference part of the rotor 100 while radially having the interval therebetween, and the respective other end portions 111b and 112b of the first and second permanent magnets 111 and 112 may be disposed on the inner circumference part of the rotor 100 while radially having the interval therebetween.

The slot part 120 includes a third portion 123 that connects the respective other end portions of the first portion 121 and the second portion 122 to each other.

The third portion 123, which is a barrier for blocking leakage magnetic flux of the permanent magnet part 110, is a secured space so that the respective other end portions 111b and 112b of the first and second permanent magnets 111 and 112 may be spaced apart from each other by a predetermined interval. Since the third portion 123 is configured as an empty space unlike the rotor 100, which is formed of the metal, it may block magnetic force intended to pass through the third portion 123.

Since the third portion 123 may block the magnetic forces toward a center direction of the rotor 100 from the respective other end portions 111b and 112b of the first and second permanent magnets 111 and 112, lines of magnetic force are less distributed around the third portion 123 as can be seen from portion 'a' of FIG. 3. Therefore, the third portion 123 blocks the leakage magnetic flux, thereby making it possible to increase effective magnetic flux between the rotor 100 and the stator 200.

The third portion 123 may include a first surface 123a connecting points 121a and 122a corresponding to each other of the respective other end portions of the first and second portions 121 and 122, and a second surface 123b connecting other points 121b and 122b corresponding to each other of the respective other end portions of the first portion and second portion 121 and 122. In addition, as illustrated in FIG. 2, based on the cross-sectional view of the rotor 100, the first surface 123a may have a horizontal length which is shorter than that of the second surface 123b, and the first surface 123a may correspond to the second distance D2.

The third portion 123 may be partitioned as one space by the first surface 123a, the second surface 123b, the other end portion 111b of the first permanent magnet 111 inserted into the first portion 121, and the other end portion 112b of the second permanent magnet 112 inserted into the second portion 122. In addition, as illustrated in FIG. 2, the second surface 123b may include three surfaces. In order to reduce the leakage magnetic flux, the first and second surfaces 123a and 123b may be a plurality of cross-sections, a plurality of curved surfaces, or a combined shape thereof. Further, the first and second surfaces 123a and 123b may partition the third portion 123 into various shapes so as to maximally block the leakage magnetic flux.

The first and second permanent magnets 111 and 112 have thicknesses which are increased from an inner diameter side of the rotor 100 to an outer diameter side thereof, as illustrated in FIG. 2. Therefore, the respective one end portions 111a and 112a of the first and second permanent magnets 111 and 112 have thicker thicknesses than the respective other end portions 111b and 112b thereof.

Thereby, the effective magnetic flux between the rotor 100 and the stator 200 may be maximized, and when the rotor 100 is rotated, centrifugal force is increased, thereby making it possible to improve output efficiency of the motor.

The respective one end portions 111a and 112a of the first and second permanent magnets 111 and 112 are disposed to be spaced apart from the outer circumferential surface 102 of the rotor 100 by a predetermined interval.

Further, as shown in the enlarged portion in FIG. 2, the respective one end portions 111a and 112a of the first and second permanent magnets 111 and 112 are disposed to be maximally adjacent to the outer circumferential surface 102 of the rotor 100 within the range in which the rotor 100 is not mechanically damaged when the rotor 100 is rotated. Thereby, the effective magnetic flux between the rotor 100 and the stator 200 may be maximized.

In addition, the respective one end portions 111a and 112a of the first and second permanent magnets 111 and 112, which have an arc shape having the same center as the outer circumferential surface 102 of the rotor 100 or the inner circumferential surface of the stator 200, may have a shape having the same curvature as the outer circumferential surface 102 of the rotor 100 or the inner circumferential surface of the stator 200.

Further, the respective one end portions 111a and 112a of the first and second permanent magnets 111 and 112 may have a shape having the same curvature as a tip outer circumferential surface 212 of the teeth 210, and may have an arc shape having the same center as the tip outer circumferential surface 212 of the teeth 210.

Therefore, referring to portion 'b' of FIG. 3, it may be seen that lines of magnetic force at one end portion 112a of the second permanent magnet 112 of another permanent magnet part 110 which is adjacent to one end portion 111a of the first permanent magnet 111 are closely generated to face the tip outer circumferential surface 212 of the teeth 210.

As such, in accordance with the fact that the respective one end portions 111a and 112a of the first and second permanent magnets 111 and 112 have the arc shape having the same curvature or the same center as the tip outer circumferential surface 212 of the teeth 210, the leakage magnetic flux directed toward an inside of the rotor 100 from the respective one end portions 111a and 112a of the first and second permanent magnets 111 and 112 is prevented, and areas that the respective one end portions 111a and 112a of the first and second permanent magnets 111 and 112 may face the tip outer circumferential surface 212 of the teeth 210 are maximized, thereby making it possible to increase the effective magnetic flux between the rotor 100 and the stator 200.

Figure 4:
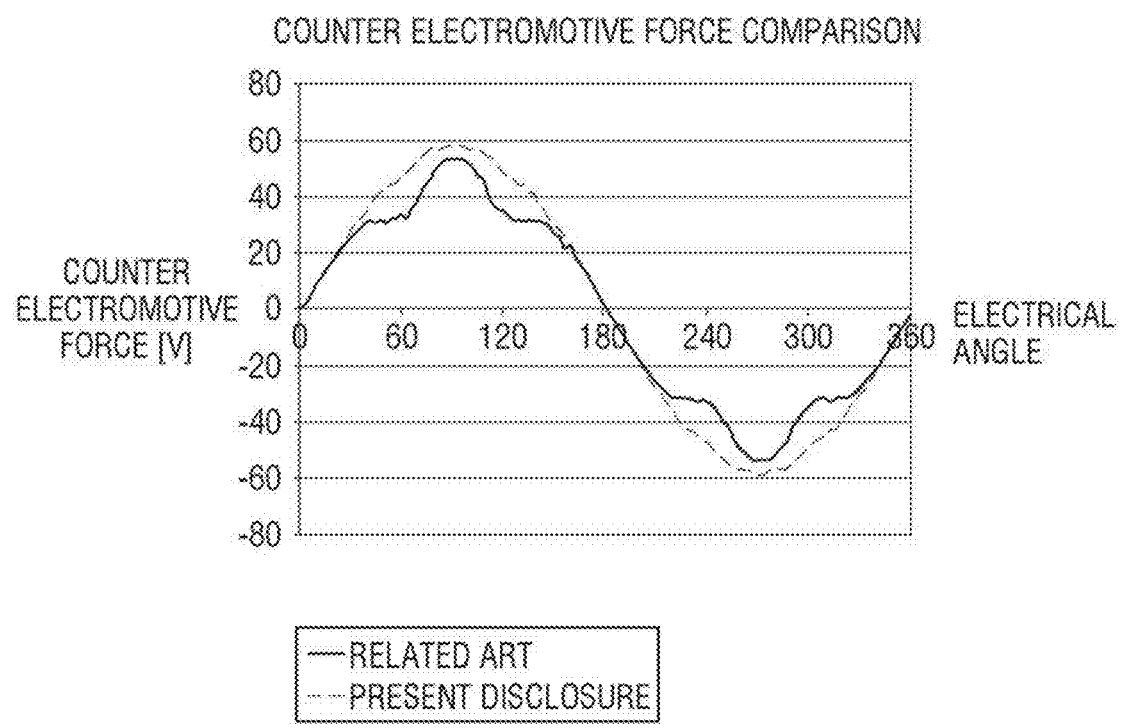
FIG. 4 is a graph comparing counter electromotive forces according to the present disclosure and the related art.

FIG. 4 is a graph measuring and comparing counter electromotive forces of a BLDC motor having a V shape according to the related art and a BLDC motor 1 according to the present disclosure.

As illustrated in FIG. 4, it may be seen that a total harmonic distortion (THD) of a line of counter electromotive force measured according to the related art is greater than the THD of the line of counter electromotive force measured in the BLDC motor 1 according to the present disclosure.

As such, since the present disclosure may reduce the total harmonic distortion of the counter electromotive force compared to the related art, it may be seen that output efficiency of the motor is improved compared to the related art.

Figure 5:
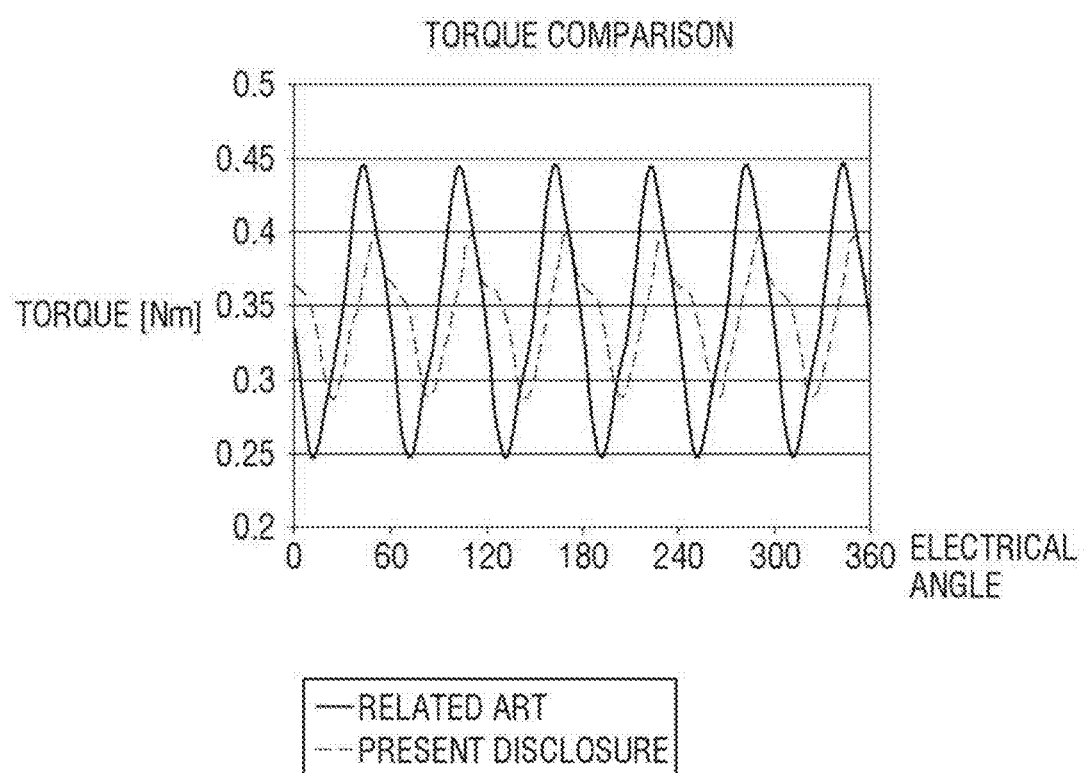
FIG. 5 is a graph comparing torques according to the present disclosure and the related art.

FIG. 5 is a graph illustrating measuring and comparing torques of a BLDC motor having a V shape according to the related art and a BLDC motor 1 according to the present disclosure.

As illustrated in FIG. 5, it may be seen that a torque ripple of torque measured according to the related art is greater than the torque ripple of torque measured in the BLDC motor 1 according to the present disclosure.

As such, since the present disclosure may reduce the torque ripple compared to the related art, it may be seen that the output efficiency of the motor is improved compared to the related art.

Figure 6:
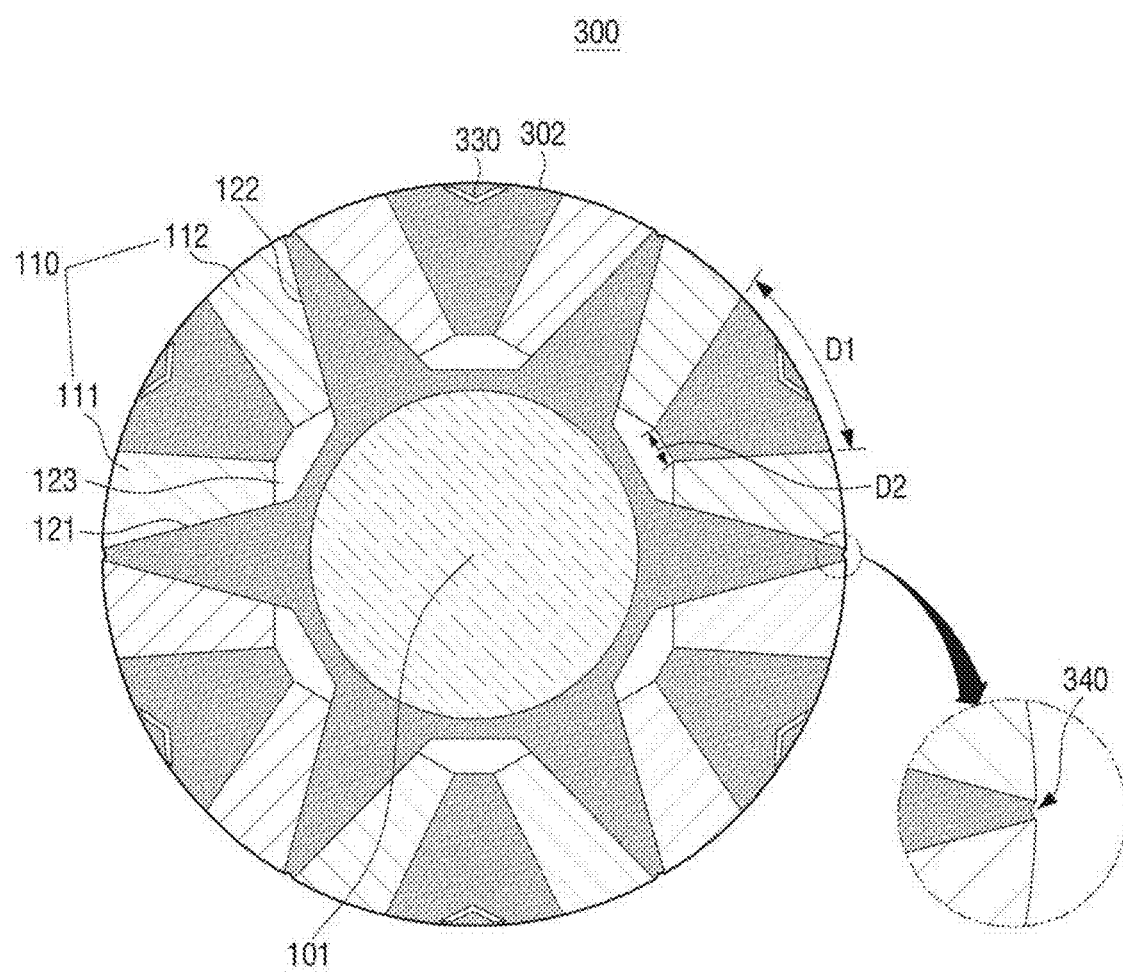
FIG. 6 is an enlarged view of the rotor which further includes a barrier hole and notch in FIG. 2.

FIG. 6 is a view illustrating a rotor 300 which further includes a plurality of barrier holes 330 and a plurality of notches 340, in the rotor illustrated in FIG. 2.

Since the permanent magnet part 110 and the slot part 120 of the rotor 300 are the same configuration as the rotor 100 in FIG. 2, a detailed description thereof will be omitted. The description will be provided below based on the barrier hole 330 and the notch 340 which are additional configurations.

The barrier holes 330, which are holes which are formed in an axial direction inside of the rotor 300, may be formed as a plurality. Each of the barrier holes 330 may be formed between the first permanent magnet 111 and the second permanent magnet 112. In this case, the barrier hole 330 may be disposed between the one end portion 111a of the first permanent magnet 111 and the one end portion 112a of the second permanent magnet 112. In addition, each of the barrier holes 330 may be disposed to be spaced apart from an outer circumferential surface 302 of the rotor 300 by a predetermined interval.

The barrier holes 330 block magnetic force between the one end portion 111a of the first permanent magnet 111 and the one end portion 112a of the second permanent magnet 112, thereby making it possible to reduce the leakage magnetic flux which may occur between the one end portion 111a of the first permanent magnet 111 and the one end portion 112a of the second permanent magnet 112, and to concentrate the effective magnetic flux between the rotor 300 and the stator 200. In addition, the barrier holes 330 may be formed in a V shape corresponding to a radial layout structure of the first and second permanent magnets 111 and 112. Thereby, the leakage magnetic flux which may occur between the first permanent magnet and the second permanent magnet may be more efficiently reduced.

The plurality of notches 340 may be formed on the outer circumferential surface 302 of the rotor 300. In this case, the notch 340 may be disposed between any one of the plurality of permanent magnet parts 110 and another permanent magnet part which is adjacent to any one permanent magnet part. Further, the notches 340 may have a V shape as illustrated in FIG. 6, but may have other shapes such as a U shape and the like.

The notches 340 radiate heat occurring between the rotor 300 and the stator 200 to the outside as the rotor 300 is rotated at high speed inside of the stator 200, thereby making it possible to prevent a reduction of the effective magnetic flux due to an increase in temperature. In addition, since the notches 340 may improve reluctance torque by increasing a saliency ratio of the rotor 300, it may further increase the output density of the BLDC motor 1 according to the present disclosure.

In the BLDC motor 1 as described above, the third portion 123 formed in the slot part 120 serves as the barrier blocking the leakage magnetic flux, and the shape of the respective one end portions 111a and 112a of the first and second permanent magnets 111 and 112 are the concentric arc shape having the same curvature as the tip outer circumferential surface 212 of the teeth 210, thereby making it possible to further increase the effective magnetic flux between the rotor 100 and the stator 200 as the same time of blocking the leakage magnetic flux. Therefore, the BLDC motor 1 according to the present disclosure has an advantage in that it reduces the total harmonic distortion (THD) of the counter electromotive force and the torque ripple compared to the related art, thereby making it possible to the output efficiency of the motor. In addition, the plurality of barrier holes 330 which may be included in the rotor 300 further reduce the leakage magnetic flux, and the notches 340 which may be formed on the outer circumferential surface 302 of the rotor 300 increase the saliency ratio as well as block the leakage magnetic flux, thereby making it possible to also improve reluctance torque of the motor.

The BLDC motor 1 as described above is not applied to be limited to the configuration of the exemplary embodiments described above, but may be variously modified. In addition, the BLDC motor 1 according to the present disclosure may be implemented in forms of various devices in which the motor is used, such as a compressor, a vehicle, a train, a washer, a cleaner, and the like.

The present disclosure has been described by an illustrative method. Terms used in the present specification are for illustration, and are not to be understood as limiting. Various variations and modifications of the present disclosure are possible according to the description above. Therefore, unless being additionally mentioned, the present disclosure may be freely executed within a scope of the claims.

What is claimed is:

1. A brushless direct current (BLDC) motor comprising:
a stator; and
a rotor disposed inside of the stator and including a plurality of permanent magnet parts, each of the permanent magnet parts including first and second permanent magnets which are disposed to have an interval therebetween,
wherein the rotor includes a slot part including a first portion into which the first permanent magnet is inserted, a second portion into which the second permanent magnet is inserted, and a third portion connecting the first and second portions to each other and the third portion being an empty space penetrating the rotor,
wherein the first and second portions have one end portions which are spaced apart from each other by a first distance and other end portions which are spaced apart from each other by a second distance which is shorter than the first distance, and the third portion connects the other end portions of the first and second portions to each other,
wherein the first and second permanent magnets have thicknesses which are increased from the other end portion adjacent to an inner circumferential surface of the rotor to the one end portion that is disposed to be spaced apart from an outer circumferential surface of the rotor by a predetermined interval, and
wherein the one end portions of the first and second permanent magnets have a shape having the same curvature as an inner circumferential surface of the stator.

2. The BLDC motor as claimed in claim 1, wherein the first and second portions have the respective one end portions disposed on an outer circumference part of the rotor, and the respective other end portions disposed on an inner circumference part of the rotor.

3. The BLDC motor as claimed in claim 2, wherein the third portion includes:
a first surface connecting points corresponding to each other of the respective other end portions of the first and second portions; and a second surface connecting other points corresponding to each other of the respective other end portions of the first and second portions, and the first and second surfaces have different horizontal lengths.

4. The BLDC motor as claimed in claim 3, wherein the first surface and the second surface are formed in a plane or a curved surface.

5. The BLDC motor as claimed in claim 1, wherein the first and second portions have thicknesses which are increased from the other end portion to the one end portion.

6. The BLDC motor as claimed in claim 1, wherein the one end portions of the first and second permanent magnets have an arc shape which is concentric with an inner circumferential surface of the stator.

7. The BLDC motor as claimed in claim 1, wherein the rotor includes a plurality of barrier holes which are each formed between the first permanent magnet and the second permanent magnet.

8. The BLDC motor as claimed in claim 7, wherein the barrier holes are disposed to be spaced apart from an outer circumferential surface of the rotor by a predetermined interval.

9. The BLDC motor as claimed in claim 8, wherein the barrier holes have a V shape.

10. The BLDC motor as claimed in claim 1, wherein the rotor includes a plurality of notches formed on an outer circumferential surface thereof.

11. The BLDC motor as claimed in claim 10, wherein the notches are disposed between any one of the plurality of permanent magnet parts and another permanent magnet part which is adjacent to the any one permanent magnet part.

12. The BLDC motor as claimed in claim 11, wherein the notches have a V or U shape.

13. A cylindrically shaped rotor having an outer circumferential surface that corresponds to an inner circumferential surface of a stator of a brushless direct current (BLDC) motor, the rotor comprising:

a first portion into which a first permanent magnet is inserted;

a second portion into which a second permanent magnet is inserted; and a third portion connecting the first and second portions to each other, wherein the first and second portions have one end portions which are spaced apart from each other by a first distance and other end portions which are spaced apart from each other by a second distance which is shorter than the first distance, wherein the third portion connects the other end portions of the first and second portions to each other and being an empty space penetrating the rotor, and wherein the first and second permanent magnets have thicknesses which are increased from the other end portion adjacent to an inner circumferential surface of the rotor to the one end portion that is disposed to be spaced apart from an outer circumferential surface of the rotor by a predetermined interval, and wherein the one end portions of the first and second permanent magnets have a shape having the same curvature as an inner circumferential surface of the stator.

14. The rotor as claimed in claim 13, wherein the third portion comprises:

a first surface connecting points corresponding to each other of the respective other end portions of the first and second portions; and a second surface connecting other points corresponding to each other of the respective other end portions of the first and second portions, and the first and second surfaces have different horizontal lengths.

15. The rotor as claimed in claim 13, wherein each of the first permanent magnet and the second permanent magnet includes a barrier hole disposed to be spaced apart from an outer circumferential surface of the rotor by a predetermined interval.

16. The rotor as claimed in claim 15, wherein the barrier holes have a V shape.

17. The rotor as claimed in claim 13, further comprising a notch formed on the outer circumferential surface of the rotor between the first permanent magnet and the second permanent magnet.

* * * * *